(12) United States Patent
Blouin et al.

(10) Patent No.: US 7,337,149 B2
(45) Date of Patent: Feb. 26, 2008

(54) SYSTEM AND METHODOLOGY FOR CALCULATING THE COST OF FUTURE SEMICONDUCTOR PRODUCTS USING REGRESSION ANALYSIS OF HISTORICAL COST DATA

(75) Inventors: Cathy L. Blouin, Franklin, VT (US); Carolyn S. Camisa, Essex Junction, VT (US); Stephanie A. Miraglia, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 09/735,256

(22) Filed: Dec. 12, 2000

(65) Prior Publication Data
US 2002/0073051 A1 Jun. 13, 2002

(51) Int. Cl.
*G06Q 99/00* (2006.01)
(52) U.S. Cl. .............. 705/400; 705/1; 700/121
(58) Field of Classification Search ............. 705/1, 705/7, 8, 10, 400; 703/2; 700/121; 707/10
See application file for complete search history.

(56) References Cited

U.S. PATENT DOCUMENTS

| | | | |
|---|---|---|---|
| 6,202,039 B1 * | 3/2001 | Finger | 702/189 |
| 6,268,226 B1 * | 7/2001 | Angell et al. | 438/16 |
| 6,470,229 B1 * | 10/2002 | Wang et al. | 700/121 |
| 6,529,790 B1 * | 3/2003 | Magee et al. | 700/121 |
| 6,532,428 B1 * | 3/2003 | Toprac | 702/97 |
| 6,625,512 B1 * | 9/2003 | Goodwin | 700/121 |
| 6,775,647 B1 * | 8/2004 | Evans et al. | 703/7 |

FOREIGN PATENT DOCUMENTS

| | | | |
|---|---|---|---|
| JP | 2000-91178 A | * | 3/2000 |
| JP | 2000091178 A | * | 3/2000 |

OTHER PUBLICATIONS

Eugene S. Meieran, "21st Semiconductor Manufacturing Capabilities" (hereinafter "Manufacturing")Dec. 1999, available at http://www.intel.com/technology/itj/q41998/articles/art_1.htm.*

(Continued)

*Primary Examiner*—John W. Hayes
*Assistant Examiner*—Freda A. Nelson
(74) *Attorney, Agent, or Firm*—Gibb & Rahman, LLC; Richard M. Kotulak, Esq.

(57) ABSTRACT

A method and structure for predicting semiconductor product costs at a fabricator entailing a storage medium which includes a database of historical critical dimensions and historical critical groundrules correlated to cost functions at the fabricator. The user interface has user inputs for new design parameters and new critical groundrules associated with a new device to be produced at the fabricator and a computer adapted to receive the user inputs, extract data from the storage medium, and compute semiconductor costs for the new device. The historical critical dimensions and the new critical dimensions are gate dimensions and the new critical dimensions are smaller than the historical critical dimensions. This device includes a future technology generation. Fabrication hardware and fabrication methods for producing the future technology generation are unknown and the relationships comprise base models and models that include options. The relationship comprise models that illustrate that costs increase exponentially as the historical critical dimensions and the historical critical groundrules are reduced.

24 Claims, 7 Drawing Sheets

OTHER PUBLICATIONS

Bob Griffin, "Enhanced dataConductor Introduced by Syntricity at the International Test Conference 2000 in Atlantic City", Oct. 2000, available at www.syntricity.com.*

Gibson et al., "Statistically Based Parametric Yield Prediction for IC"Nov. 1997, 14 pages, IEEE Transactions On Semiconductor Manufacturing, vol. 10, No. 4.*

Meieran, Eugene S, "21st Century Semiconductor manufacturing capabilities", Q4, 1998, Intel Technology Journal.*

Way et al., "An Overview of manufacturing Yield and reliability Modeling for Semiconductor Products", Aug. 1999, Proceedings of the IEEE, vol. 87, No. 8.*

* cited by examiner

PREDICTED vs ACTUAL COST COMPARISON
OF
TECHNOLOGY COST ESTIMATE WORKSHEET

| TECHNOLOGY | NAME | PREDICTED | ACTUAL | % DELTA |
|---|---|---|---|---|
| CM4L 3LM | OMNI | $872 | $833 | 4.7% |
| CM4LP 3LM | PHEONIX | $805 | $856 | -6.0% |
| CM5S 4LM | MUSTANG | $1,188 | $1,121 | 6.0% |
| CM5S1 5LM | RACER | $1,236 | $1,227 | 0.7% |
| CM5X 4LM | APACHE | $1,191 | $1,152 | 3.4% |
| CM5X2 4LM | FURY | $1,248 | $1,167 | 6.9% |
| CM6S 4LM | HURRICANE | $1,322 | $1,340 | -1.3% |
| CM6S2 4LM | TIGGER | $1,407 | $1,299 | 8.3% |
| CM6S2 5LM | SC / 98 | $1,560 | $1,469 | 6.2% |
| CM6SF 4LM | PYTHON | $1,531 | $1,437 | 6.5% |
| CM6SF 5LM | LONGTRAIL | $1,816 | $1,691 | 7.4% |
| CM6X 4LM | TYPHOON | $1,704 | $1,670 | 2.0% |
| CM7S 6LM | LONESTAR | $2,464 | $2,607 | -5.5% |
| CM7SF 3LM | COMMANDER | $1,918 | $2,020 | -5.0% |
| CM8S 4LM | BLIZZARD | $2,238 | $2,240 | -0.1% |
| SIGE6SF | COPERNICUS | $2,809 | $2,726 | 3.0% |
| ICEC8S2 6LM | MAJESTIC* | $3,214 | $3,325 | -3.3% |
| ICEC9S 7LM | MAKO** | $3,870 | $3,534 | 9.5% |

\* Predictive Cost Estimated 12 Months Prior to Actual
\*\* Predictive Cost Estimated 18 Months Prior to Actual

FIG.2

TECHNOLOGY COST ESTIMATE WORKSHEET
FOR THE FOLLOWING TECHNOLOGIES
CM4S, CM4L, CM5L, CM5S, CM5S6, CM6X, CM5X2, CM6S, CM6S2, CM5SF, CM6X1, CM7S, CM7SF, CM8S, CS019S, CS019S2, CM9SF, CM8SF, ICEC7S, ICEC8S2, CS0110S

TECHNOLOGY ──────────▶ ▨ ◀─ 301
PHOTO GROUNDRULE ────▶ ☐ ◀─ 302    300
CURRENTLY IN PRODUCTION Y OR N ─▶ ▨ ◀─ 303
IF "N" 10% CONTINGENCY ADDED

FEOL BASE COST EXCLUDES: BR, KV, TAILORS, DUAL GATE AND OP LEVELS   FULL CAPACITY COST | MATURE FULL CAPACITY COST

FEOL BASE COST ──────────▶  ☐ ─313  ☐ ─314

FEOL OPTIONAL LEVELS:       # OF  312                    310
                311╲ Y or N  MASK       ─315       ─316
BR RESISTOR                                0          0
KV LEVEL                                   0          0
TAILOR VTS                                 0          0
DUAL GATE                                  0          0
OP RESISTOR                                0          0
EDRAM OPTION:                              0          0
(DT,AE,AW,PP)
                                    317╲  320    ─318
FEOL OPTIONAL COST ──────── 319╲    ☐ 0         ☐ 0
TOTAL FEOL COST WITH OPTIONS ─────▶ ☐ 0         ☐ 0

BEOL BASE COST EXCLUDES: MC, MIM CAPACITOR, AND TD LEVELS BASED ON 4 THIN LEVELS OF METAL
                                              FULL CAPACITY COST | MATURE FULL CAPACITY COST

BEOL BASE COST ──▶                              ☐            ☐
BASE COST = 4 THIN LEVELS OF METAL             321╱         322╱
                                                                    370
DELETE METAL LEVELS:
For products with LESS than 4LM
Indicate type of metal and # of levels
                                   # OF   324
           323╲  Y or N            LOM ╱       325╲       326╲
Aluminum                                         0          0
Thin Copper                         ──25/level for Cu  0    0
Thick Copper                        ──60/level for Cu  0    0

*Shaded boxes need input

FIG.3A

EQUATIONS FOR TECHNOLOGY COST ESTIMATE WORKSHEET

| FEATURE | FULL CAPACITY COST EQUATION | MATURE COST EQUATION | WHERE: | HOW DERIVED |
|---|---|---|---|---|
| FEOL BASE | $Y=272X^{-0.53}$ | $Y=241X^{-0.493}$ | Y = FEOL Base Cost<br>X = Groundrule | Least Squares Analysis |
| BEOL BASE | $Y=417X^{-0.486}$ | $Y=388X^{-0.461}$ | Y = BEOL Base Cost<br>X = Groundrule | Least Squares Analysis |
| BR RESISTOR | $Y=15.1X^{-0.362}$ | $Y=13.5X^{-0.352}$ | Y = BR Resistor Cost<br>X = Groundrule | Least Squares Analysis |
| KV LEVEL | $Y=15.5X^{-0.297}$ | $Y=12.5X^{-0.489}$ | Y = KV Level Cost<br>X = Groundrule | Least Squares Analysis |
| TAILOR VTS | $Y=49.8X^{-0.048}$ | $Y=45.9X^{-0.0302}$ | Y = Tailor VTs Cost<br>X = Groundrule | Least Squares Analysis |
| DUAL GATE | $Y=38.2X^{0.803}$ | $Y=33.7X^{0.815}$ | Y = Dual Gate Cost<br>X = Dual Gate Levels | Least Squares Analysis |
| OP RESISTOR | $Y=19.8X^{-0.512}$ | $Y=17.9X^{-0.502}$ | Y = OP Resistor Cost<br>X = Groundrule | Least Squares Analysis |
| MC LEVEL | $Y=58.8X^{-0.597}$ | $Y=53.9X^{-0.584}$ | Y = MC Level Cost<br>X = Groundrule | Least Squares Analysis |
| METAL LEVELS | $Y=111X^{-0.302}$ | $Y=103X^{-0.282}$ | Y = Metal Level Cost<br>X = Groundrule | Least Squares Analysis |
| MIM CAPACITOR | $Y=34.2X^{-0.523}$ | $Y=30.8X^{-0.533}$ | Y = MIM Cap Cost<br>X = Groundrule | Least Squares Analysis |
| TD LEVEL | 85 | 77 | NA | Direct Measurement |
| EDRAM | 475 | 450 | NA | Direct Measurement |
| CU ADDER | 100 | 80 | NA | Direct Measurement |

FIG.4

SYSTEM AND METHODOLOGY FOR CALCULATING THE COST OF FUTURE SEMICONDUCTOR PRODUCTS USING REGRESSION ANALYSIS OF HISTORICAL COST DATA

BACKGROUND OF THE INVENTION

1. Field of the Invention

The present invention generally relates to cost prediction systems and more particularly to a novel system that predicts costs for future generations of technologies (for which the tooling and fabrication processes are unknown) based upon a regression analysis of current technologies.

2. Description of the Related Art

Historical cost models look back in time at what has recently been run in a fabricator in order to compute "historical" (or actual) costs of products running in the fabricator. Historical cost models can even, to a degree, be enhanced to provide predictive cost data. However, the predictive capabilities of historical cost models are limited to products that are very similar to products currently running in the fabricator (such products are sometimes called "extensions" of current products). In the semiconductor art field, the gate dimension (e.g., gate length in a transistor) is substantially the same for each technology generation. Therefore, a new technology generation (or simply "technology") is achieved when the gate dimension is reduced by a significant portion (e.g., greater than 10%). An extension of a current technology will utilize the same gate dimension, but may include other enhancements not related to gate dimension.

Historical cost models have traditionally been less useful for costing future products that have much tighter specifications than the technology generation currently running in the fabricator. New processing techniques and tools are often required to achieve the next technology generation of gate dimension (i.e., smaller chip dimensions). Since many of these new techniques and tools do not yet exist in the fabricator, it is very difficult to accurately predict the cost of a wafer that will be running in the fabricator 1 to 5 years in the future.

At the same time, there is a desire in a highly competitive business environment to shrink groundrules and provide the next generation of technology as quickly as possible. Businesses are frequently asked to provide costs for products before they have the tools and techniques to produce them. Accurate predictive capability is required to make sound business case decisions regarding which products will be profitable now and in the future. Therefore, there is a need for a method and system that can predict the cost per wafer for future generations of technologies based solely upon historical data of known technologies.

SUMMARY OF THE INVENTION

It is, therefore, an object of the present invention to provide a structure and method for predicting semiconductor product costs at a fabricator entailing a storage medium which includes a database of historical critical dimensions and historical critical groundrules correlated to cost functions at the fabricator. The user interface has user inputs for new design parameters and new critical groundrules associated with a new device to be produced at the fabricator and a computer adapted to receive the user inputs, extract data from the storage medium and compute semiconductor costs for the new device. The historical critical dimensions and the new critical dimensions are gate dimensions and the new critical dimensions are smaller than the historical critical dimensions. This device includes a future technology generation. Fabrication hardware and fabrication methods for producing the future technology generation are unknown and the relationships comprise base models and models that include options. The relationships comprise models that illustrate that costs increase exponentially as the historical critical dimensions and the historical critical groundrules are reduced.

The invention also comprises a method of predicting semiconductor product costs that performs a regression analysis on historical costs of historical critical dimensions at a fabricator, using the historical critical dimensions as independent variables and the historical costs as dependent variables. Where creating, in a database, models from the regression analysis showing a relationship between the historical critical dimensions and the historical costs the invention inputs new design parameters and new critical dimensions of a new device into the database and predicts product costs of the new device based on the models.

A system embodiment of the invention for predicting semiconductor product costs at a fabricator includes a regression analyzer adapted to determine relationships between historical critical dimensions of historical technologies and costs of the historical technologies, a user interface for inputting a new critical dimension of a new technology and a calculator for predicting a cost of the new technology based on the new critical dimension and the relationships.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is a chart illustrating the predicted cost vs. actual costs of different generations of technology;

FIG. 4 is a chart of equations for a technology cost estimate worksheet;

DETAILED DESCRIPTION OF PREFERRED EMBODIMENTS OF THE INVENTION

The invention solves the foregoing problem by extrapolating current costs of different technologies to future technologies. In other words, the invention looks at many different technology generations (e.g. 4th-9th generation of silicon-based technologies) and predicts the cost of future unknown generations (e.g., 10th or 11th generation of silicon-based technology). As mentioned above, in silicon-based technology, the generations are defined by relatively large reductions in the dimensions of the gate conductor in a transistor structure. Therefore, the invention looks at historical costs for technologies producing different gate dimensions to predict the cost of future technologies that produce even smaller gate dimensions. No previous methodology or system calculates cost across different technology generations. Instead, conventional cost prediction systems only predict cost within one technology generation (e.g., variations of a technology for a given gate dimension).

More specifically, the invention performs regression analysis on costs for all technologies currently running in a fabricator. In the examples shown in FIG. 2 (discussed below), the 4th-9th generations of silicon processing are run in a fabricator.

Figure 1:
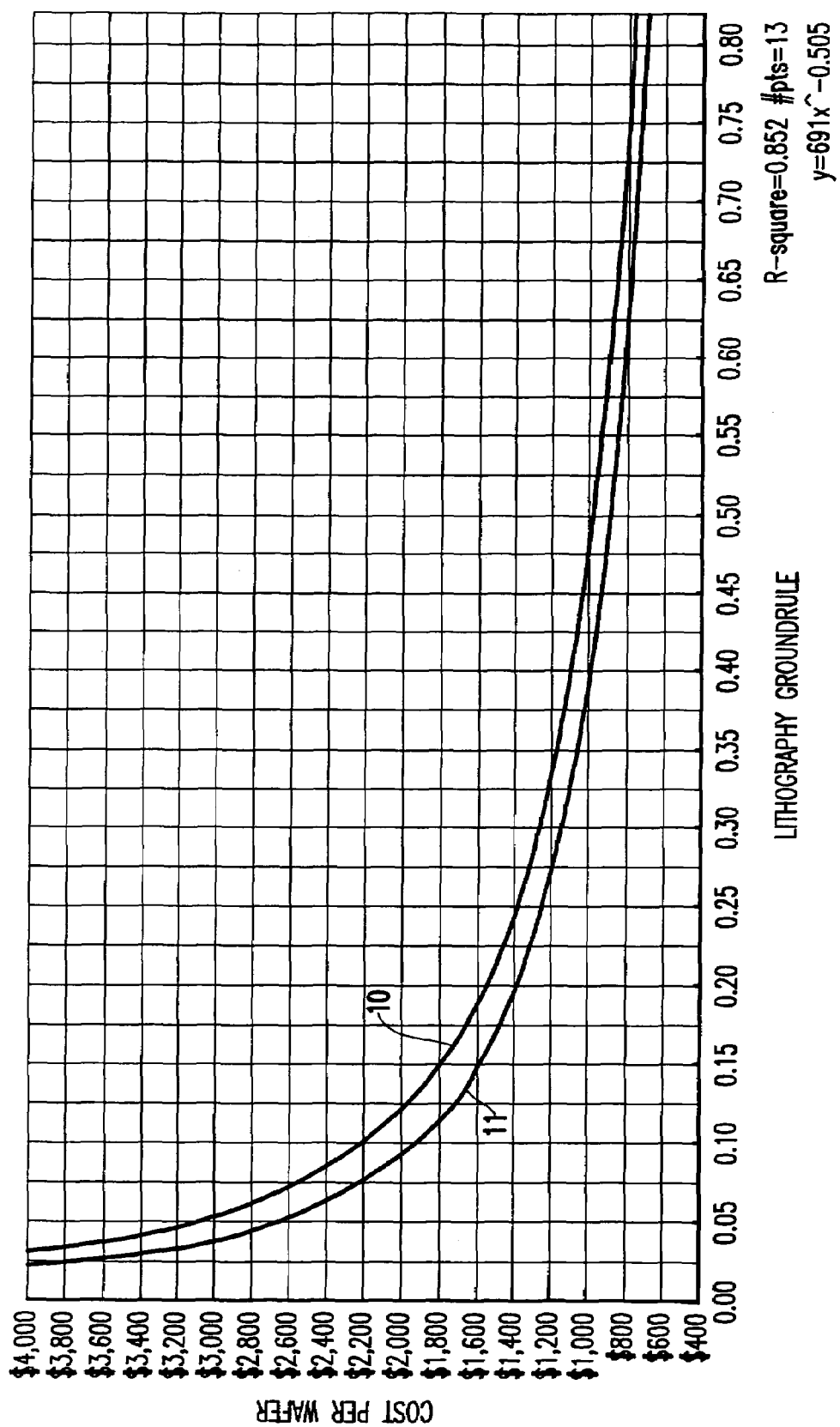
FIG. 1 is a graph illustrating the cost vs. critical gate dimension curve calculated with the invention.

The inventive regression analysis is performed by treating the lithography generation (or critical gate dimension) as the independent variable and wafer cost as the dependent variable. The invention produces a relationship curve such as the one illustrated in FIG. 1. Thus, FIG. 1 illustrates a power relationship between cost and technology generation (critical gate dimension lithographic groundrule). As can be seen from FIG. 1, as the dimension of printed images of chip circuitry decreases (e.g., gate dimension decreases), cost increases exponentially as shown by the line 10 representing current costs and line 11 representing mature costs.

The regression analysis is actually performed in steps; one step for each section of semiconductor processing, with the results of all equations added together to form a composite equation.

FIGS. 1 is an example of relationships between technology critical dimension and costs for a particular semiconductor fabricator and can be used in conjunction with the worksheet shown in FIG. 3 below (or any other similar interface), by that semiconductor fabricator to project costs of future unknown technologies.

Thus, the invention enables the prediction of wafer processing cost before process flows even exist, indeed, even before the technology itself has been defined. As shown in FIG. 2, the invention predicts cost within 7%-10% of actual cost (e.g., % Delta). More specifically, FIG. 2 illustrates the predicted and actual costs of two 4th generation technology (CM4L 3LM—which stands for CMOS 4th ("CM4") generation "L" with 3 last metalization ("3LM") layers; and CM4LP 3LM); four 5th generation technologies (CM5S 4LM, CM5S1 4LM, CM5X 4LM, and CM5X2 4LM); six 6th generation technologies (CM6S 4LM; CM6S2 4LM; CM6S2 5LM, CM6SF 4LM, CM6SF 5LM, CM6X 4LM, and SIGE6SF); two 7th generation technologies (CM7S 6LM and CM7SF 3LM); two 8th generation technology (CM8S 4LM and ICEC8S52 6LM); and a 9th generation technology (ICEC9S 7LM). As can be seen, the invention performs the prediction of future unknown technologies very well. The invention has been shown to predict future unknown technologies as well. For example, a predicted cost for 9th generation technology (CM9S 4LM) computed a year before the technology was introduced to the fabricator, yielded a predicted cost within 10% of the actual cost.

It is possible for the invention to predict wafer processing costs before process flows exist and before the technology itself has been defined because of three main features of semiconductor processing. The first is that semiconductor costs are largely driven by equipment, rather than materials or staffing. Second, while new equipment may be used in different or novel ways to achieve the new groundrules, new equipment is introduced each generation. Third, both of these things are especially true for photolithography and etch tools, which are the most critical tools toward achieving smaller dimensions. What these three features suggest, and what the invention relies upon, is that the cost of silicon-based semiconductors is predictive, even without knowing the specific processing or equipment parameters.

Figures 3A, 3B, 3C:
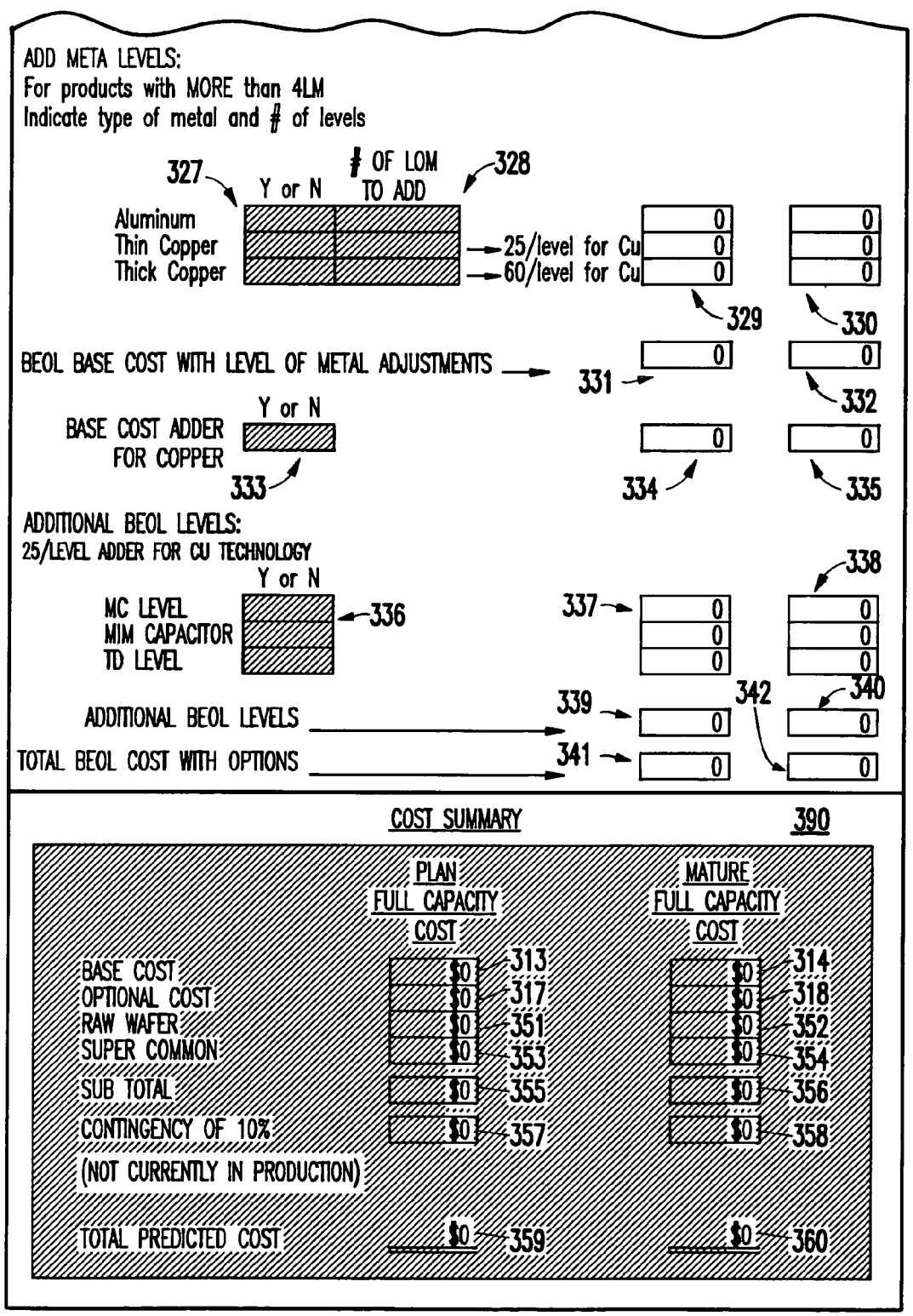
FIG. 3 is an exemplary worksheet used to predict cost for users of the invention.

Referring now to FIG. 3, a technology cost estimate worksheet is presented. The worksheet shown in FIG. 3 is merely exemplary and, as would be known by a user of the invention, any similar input device or graphic user interface can be utilized to gather the information required to provide a cost estimate. Once information is obtained from the worksheet, the invention references the output of the regression analysis (e.g., FIG. 1) to predict the future costs associated with a future technology.

In the first section of the worksheet 300, the technology 301 and photo groundrule 302 are input. The technology 301 can be a new technology or one of the technologies discussed above with respect to FIG. 2 (e.g., CM4S). Additionally, the user indicates whether the technology is currently in production in item 303. A 'Y' would indicate that the estimate to be made is for an extension or variation of a known technology. An 'N' would indicate that the estimate to be made is for an unknown or new technology.

In section 310, the front-end of the processing line (FEOL) base cost is calculated. The front-end base processes include all semiconductor manufacturing steps up to and including the contact level, less optional levels. These processes are well known to those ordinarily skilled in the art and will not be discussed herein so as not to obscure the salient features of the invention. In item 313, the front-end base cost for different features (e.g., FEOL Base, BR Resistor) is calculated with the equations shown in FIG. 4. FIG. 4 shows the equation for the mature cost as well. Full capacity costs are based on the assumption of a full fabricator with some capacity held for development and inefficiency. The mature cost has no cycle time held. The equations shown in FIG. 4 are merely an example of one fabricator and the invention is not limited to the exact equations shown therein. Instead, as would be known by one ordinarily skilled in the art, the equations for different fabricators will be different than those shown in FIG. 4. The invention can apply a regression analysis to any historical data from any fabricator to arrive at the unique equations specific to that fabricator.

Also, in section 310 various options for the technology can be selected (column 311). The number of masks required for the dual gate option must be specified (item 312). In items 315 and 316 full capacity and mature costs are calculated using equations derived from the curves shown in FIG. 1. In all cases, different process flows run in the fabricator were costed using a historical cost model. Least Squares Analysis performed on the points enabled the generation of the general equations.

Item 317 and 318 are subtotals of the FEOL optional levels 315 and 316. Items 319 and 320 represent the base cost 313, 314 and optional cost 319, 320 combined.

In a similar manner, in section 370 the base costs of the back of the line (BEOL) processing (e.g.; processing that occurs after the cap layer is formed) 321, 322 are calculated assuming four thin levels of metal and using the equation for the cost of a metal level shown in FIG. 4.

In items 323 and 324, the user has the option of deleting various metal levels. These inputs are used to calculate the reduction in base cost shown as items 325 and 326. Again using the cost derived from the metal level equation shown in FIG. 4.

In a similar manner, in items 327 and 328, the user can optionally add additional metal levels. In items 329 and 330, the costs of the additional levels is calculated using the equation shown in FIG. 4.

Items 331 and 332 represent subtotals of the base cost 321, 322 having the deleted metal levels 325, 326 being removed or the additional metal levels 329, 330 being added.

In item 333, the user can request copper wiring. Using the equation shown in FIG. 4, the full capacity cost 334 and mature full capacity cost 335 for utilizing copper is calculated.

Item 336 allows the user to add an interconnect level (MC), a metal-insulator-metal capacitor (MIM) or TD level (required for high performance copper products) additional BEOL levels. Using the equation specified in FIG. 4, items 337 and 338 provide the forecasted cost of such additional levels.

Items 339 and 340 represent a sum total of items 337 and 338. Item 341 is a summation of the previous subtotals 331, 334 and 339. Similarly, for the mature cost, item 342 represents a total of the subtotals 332, 335 and 340.

In section 390, the costs are summarized. More specifically for the full capacity cost, the base cost 313 and optional costs 317 are combined with a raw wafer cost 351 and super common processing 355. Super common processing includes all initial wafer treatments such as epi deposition (if raw wafers do not include it), initial wafer clean, and nitride and polysilicon deposition. If the technology is not currently in production, a contingency of 10% is added in item 357. Items 355 and 357 are then summarized in item 359 to derive a total projected cost.

In a similar manner, for the mature full capacity cost, the base cost 314 is added to the optional cost 318, the raw wafer cost 352, and the super common 354. Once again a subtotal appears in item 356. Also, 10% 358 is added if the technology is not currently in production. Items 356 and 358 are then summarized in item 360 to produce the total predicted cost for the mature for capacity.

Figure 5:
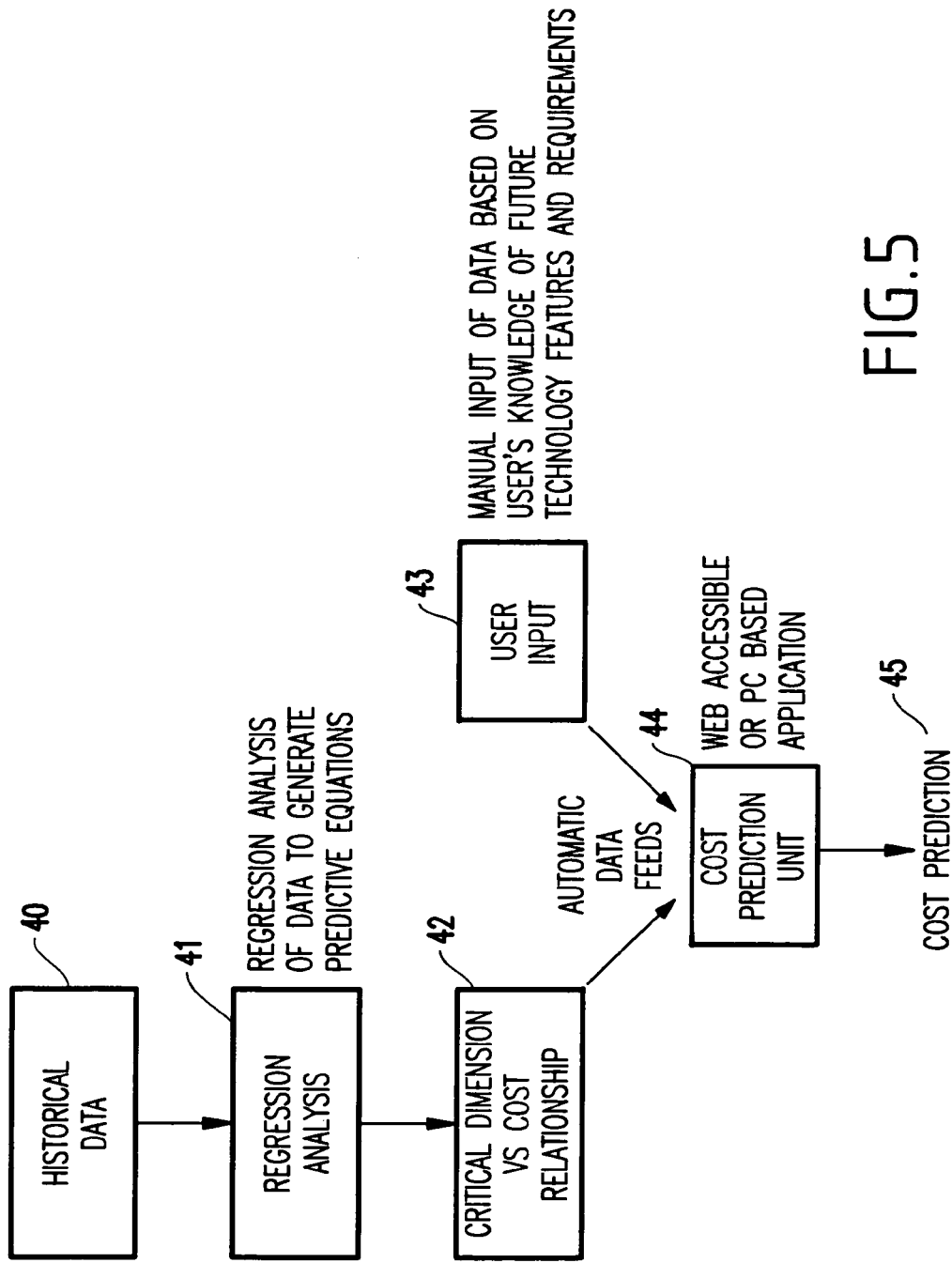
FIG. 5 is a schematic diagram showing the overall technology cost model overview.

Referring now to FIG. 5, a system embodiment of the invention is illustrated. More specifically, FIG. 5 illustrates a regression analyzer 41 which performs least-square-analysis (also known as regression analysis) on historical data 40 from many different technology generations to create the critical dimensions/cost relationship discussed above. The critical dimensions/cost relationship can be stored, for example, in a database 42. A calculator or computer can be utilized as the cost prediction unit 44 which takes user input regarding a new technology through any user interface 43 (such as the interface shown in FIG. 3) and calculates the cost prediction for the new technology 45 based upon the critical dimensions/cost relationship 42.

Figure 6:
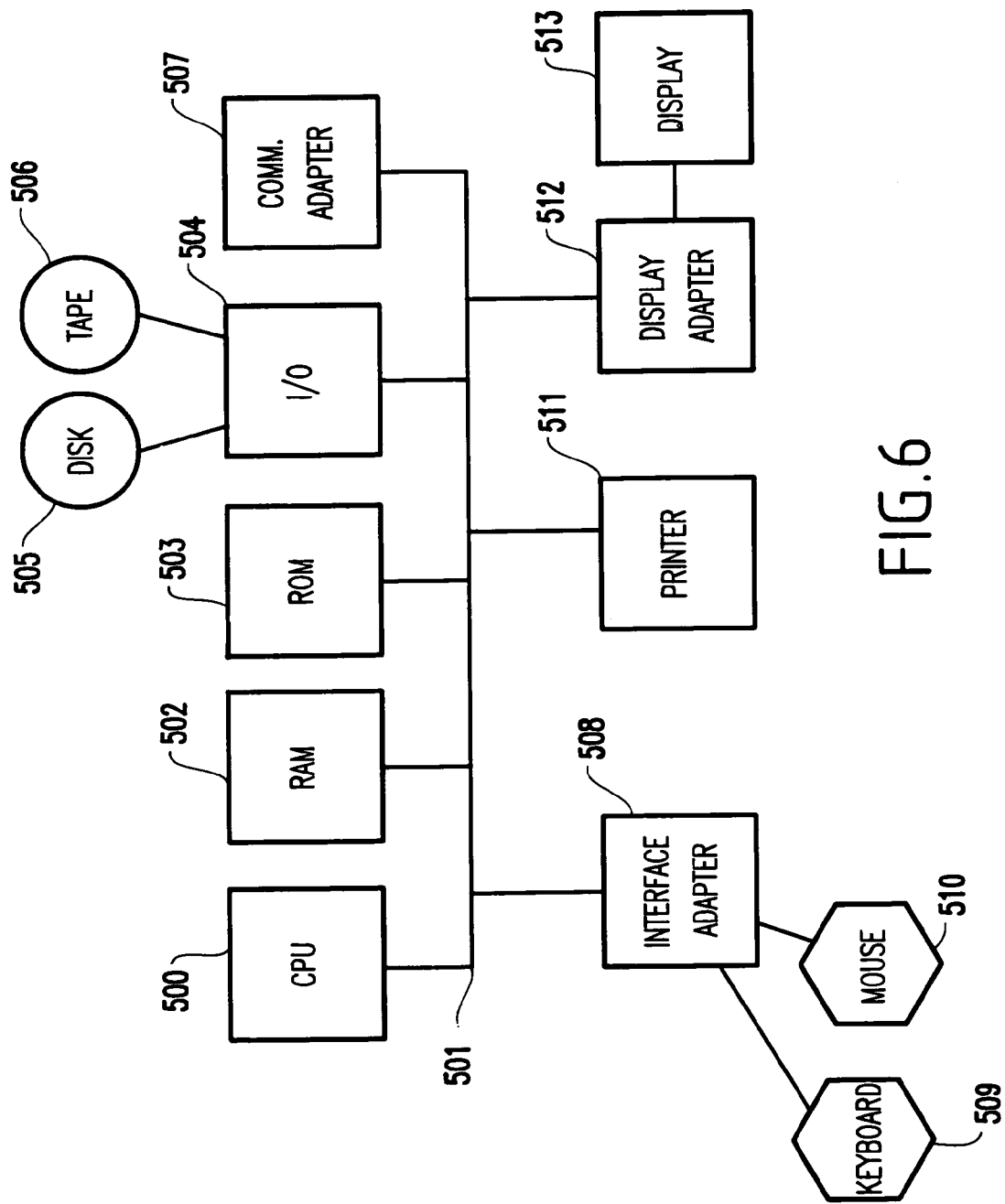
FIG. 6 is a hardware implementation of the method of the invention.

While the overall methodology of the invention is described above, the invention can be embodied in any number of different types of systems and executed in any number of different ways, as would be known by one ordinarily skilled in the art. For example, as illustrated in FIG. 6, a typical hardware configuration of an information handling/computer system in accordance with the invention preferably has at least one processor or central processing unit (CPU) 500. For example, the central processing unit 500 could include various weighting units, classification units, clustering units, filters, adders, subtractors, comparators, etc. Alternatively, as would be known by one ordinarily skilled in the art given this disclosure, multiple specialized CPU's (or other similar individual functional units) could perform the same processing, weighting, classifying, clustering, filtering, adding, subtracting, comparing, etc.

The CPU 500 is interconnected via a system bus 501 to a random access memory (RAM) 502, read-only memory (ROM) 503, input/output (I/O) adapter 504 (for connecting peripheral devices such as disk units 505 and tape drives 506 to the bus 501), communication adapter 507 (for connecting an information handling system to a data processing network) user interface adapter 508 (for connecting peripherals 509-510 such as a keyboard, mouse, imager, microphone, speaker and/or other interface device to the bus 501), a printer 511, and display adapter 512 (for connecting the bus 501 to a display device 513). The invention could be implemented using the structure shown in FIG. 6 by including the inventive method, described above, within a computer program stored on the storage device 505. Such a computer program would act on a information supplied through the interface units 509-510 or through the network connection 507. The system would then automatically perform the processing discussed above and produce an output on the display 513, through the printer 511 or back to the network 507.

The benefits of this model are that they allow interpolation and extrapolation of existing cost data to predict future cost data. This is especially useful in a manufacturing environment where future products are manufactured from the same basic raw materials processing principles, but can be made with different features, or, future products that are improved performance versions of current products. Outside the manufacturing environment, these same principles could be applied to any costing effort where costs are, 1) known (a historical database exists), and, 2) the critical parameters that drive cost are known or can be derived. In that case, regression analysis can be used and a user interface created to enable the prediction of future products.

While the invention has been described in terms of preferred embodiments, those skilled in the art will recognize that the invention can be practiced with modification within the spirit and scope of the appended claims.

What is claimed is:

1. A system for calculating semiconductor product costs at a fabricator comprising:

a storage medium including a database of historical costs and historical critical gate dimensions of different technologies run at said fabricator;

a user interface adapted to receive user inputs for new design parameters and new critical gate dimensions associated with a new device to be produced at said fabricator; and a computer adapted to:

receive said user inputs; perform a regression analysis using said historical critical gate dimensions as independent variables and said historical costs as dependent variables, wherein said regression analysis produces relationship curves that only show relationships between said historical critical gate dimensions and said historical costs; and calculate product costs of said new device based on said user inputs and said relationship curves.

2. The system in claim 1, wherein said historical critical gate dimensions and said new critical gate dimensions comprise gate dimensions.

3. The system in claim 1, wherein said new critical gate dimensions are smaller than said historical critical gate dimensions.

4. The system in claim 1, wherein said new device comprises a technology generation that is yet to be developed.

5. The system in claim 4, wherein fabrication hardware and fabrication methods for producing said technology generation are unknown.

6. The system in claim 1, wherein said relationship curves illustrate that costs increase exponentially as said historical critical gate dimensions and said historical critical ground rules are reduced.

7. A method of calculating semiconductor product costs comprising:
- storing, in a database, historical costs and historical critical gate dimensions of different technologies run at a fabricator;
- performing a regression analysis using said historical critical gate dimensions as independent variables and said historical costs as dependent variables, wherein said regression analysis produces relationship curves that show only relationships between said historical critical gate dimensions and said historical costs;
- inputting new design parameters and new critical gate dimensions of a new device into said database; and
- calculating product costs of said new device based on said relationship curves.

8. The method in claim 7, wherein said historical critical gate dimensions and said new critical gate dimensions comprise gate dimensions.

9. The method in claim 7, wherein said new critical gate dimensions are smaller than said historical critical gate dimensions.

10. The method in claim 7, wherein said new device comprises a technology generation that is yet to be developed.

11. The method in claim 10, wherein fabrication hardware and fabrication methods for producing said technology generation are unknown.

12. The method in claim 7, wherein said relationship curves illustrate that costs increase exponentially as said historical critical gate dimensions and said historical groundrules are reduced.

13. A system for calculating semiconductor product costs at a fabricator comprising:
- a regression analyzer adapted to produce relationship curves that show relationships between historical critical gate dimensions and historical costs of different technologies run at said fabricator;
- a user interface for inputting a new critical dimension of a new technology; and a calculator for calculating a cost of said new technology based only on said new critical gate dimension and said relationship curves.

14. The system in claim 13, wherein said historical critical gate dimensions and said new critical gate dimensions comprise gate dimensions.

15. The system in claim 13, wherein said new critical gate dimensions are smaller than said historical critical gate dimensions.

16. The system in claim 13, further comprising a storage unit adapted to store a database of said relationships.

17. The system in claim 13, wherein said new device comprises a technology generation that is yet to be developed.

18. The system in claim 17, wherein fabrication hardware and fabrication methods for producing said technology generation are unknown.

19. A computer program product stored a storage device readable by a computer, wherein said computer program product comprises a computer program for performing a method of calculating semiconductor product costs, said method comprising:
- storing, in a database, historical costs and historical critical gate dimensions of different technologies run at a fabricator;
- performing a regression analysis using said historical critical gate dimensions as independent variables and said historical costs as dependent variables, wherein said regression analysis produces relationship curves that only show relationships between said historical critical gate dimensions and said historical costs;
- inputting new design parameters and new critical gate dimensions of a new device into said database; and
- calculating product costs of said new device based on said relationship curves.

20. The computer program product in claim 19, wherein said historical critical gate dimensions and said new critical gate dimensions comprise gate dimensions.

21. The computer program product in claim 19, wherein said new critical gate dimensions are smaller than said historical critical gate dimensions.

22. The computer program product in claim 19, wherein said new device comprises a technology generation that is yet to be developed.

23. The computer program product in claim 22, wherein fabrication hardware and fabrication computer program products for producing said technology generation are unknown.

24. The computer program product in claim 19, wherein said relationship curves illustrate that costs increase exponentially as said historical critical gate dimensions are reduced.

* * * * *